(12) United States Patent
Yatirajula et al.

(10) Patent No.: US 10,958,549 B2
(45) Date of Patent: Mar. 23, 2021

(54) METHOD AND SYSTEM FOR ANALYZING PROTOCOL MESSAGE SEQUENCE COMMUNICATED OVER A NETWORK

(71) Applicant: Wipro Limited, Bangalore (IN)

(72) Inventors: Varadaraj Yatirajula, Bengaluru (IN); Ajay Talreja, Pune (IN)

(73) Assignee: Wipro Limited, Bangalore (IN)

(*) Notice: Subject to any disclaimer, the term of this patent is extended or adjusted under 35 U.S.C. 154(b) by 71 days.

(21) Appl. No.: 16/106,833

(22) Filed: Aug. 21, 2018

(65) Prior Publication Data
US 2020/0007423 A1 Jan. 2, 2020

(30) Foreign Application Priority Data
Jun. 29, 2018 (IN) .......................... IN201841024386

(51) Int. Cl.
| H04L 12/26 | (2006.01) |
| H04L 12/24 | (2006.01) |
| H04L 29/06 | (2006.01) |
| G06N 20/00 | (2019.01) |

(52) U.S. Cl.
CPC ......... *H04L 43/0823* (2013.01); *G06N 20/00* (2019.01); *H04L 41/0631* (2013.01); *H04L 41/0654* (2013.01); *H04L 41/16* (2013.01); *H04L 65/102* (2013.01); *H04L 65/1006* (2013.01); *H04L 65/1083* (2013.01); *H04L 69/22* (2013.01)

(58) Field of Classification Search
CPC ............. H04L 43/0823; H04L 41/0631; H04L 41/0654; H04L 41/16; H04L 65/1006; H04L 65/102; H04L 65/1083; H04L 69/22; G06N 20/00
See application file for complete search history.

(56) References Cited

U.S. PATENT DOCUMENTS

| 2002/0016937 | A1 | 2/2002 | Houh | |
| 2003/0086425 | A1* | 5/2003 | Bearden | H04L 41/0213 370/392 |
| 2007/0067450 | A1 | 3/2007 | Malloy et al. | |
| 2007/0150949 | A1* | 6/2007 | Futamura | H04L 63/1416 726/22 |
| 2008/0037532 | A1* | 2/2008 | Sykes | H04L 41/147 370/389 |

(Continued)

*Primary Examiner* — Nicholas R Taylor
*Assistant Examiner* — Sanjoy Roy
(74) *Attorney, Agent, or Firm* — Finnegan, Henderson, Farabow, Garrett & Dunner, LLP

(57) ABSTRACT

A method of analyzing protocol message sequence communicated over a network, involves receiving one or more protocol messages associated with a real-time communication session between a first network node and a second network node in the network. A set of packet attributes corresponding to the one or more protocol messages associated with the real-time communication session may be extracted. Each one of the set of packet attributes may be compared with a plurality of baseline attributes. At least one error condition in at least one protocol message received from the first network node may be determined based on the comparison. A corrective measure on the first network node may be performed based on the at least one error condition in the at least one protocol message received from the first network node.

15 Claims, 7 Drawing Sheets

(56) References Cited

U.S. PATENT DOCUMENTS

| | | | | |
|---|---|---|---|---|
| 2008/0080376 A1* | 4/2008 | Adhikari | ............ | H04L 41/0631 |
| | | | | 370/231 |
| 2011/0176427 A1* | 7/2011 | Huang | ................. | H04L 43/065 |
| | | | | 370/241 |
| 2012/0320784 A1* | 12/2012 | Edwards | ................ | H04L 12/66 |
| | | | | 370/252 |
| 2013/0021933 A1* | 1/2013 | Kovvali | ............... | H04W 88/18 |
| | | | | 370/252 |
| 2013/0279678 A1* | 10/2013 | Beerse | ............... | H04M 3/2227 |
| | | | | 379/202.01 |

* cited by examiner

```
INVITE sip:bob@biloxi.example.com SIP/2.0
Via: SIP/2.0/TCP client.atlanta.example.com:5060;branch=z9h4b
Max-Forwards: 0
From: Alice <sip:alice@atlanta.example.com>;tag=9fxced76sl
To: Bob <sip:bob@biloxi.example.com>
Call-ID: 3848276298220188511@atlanta.example.com
CSeq: 1 INVITE
Contact: <sip:alice@client.atlanta.example.com;transport=tcp>
Content-Type: sdp
Content-Length: 151 v=0
o= alice 2890844526 2890844526 IN IP4 client.atlanta.example.com
s=-
c=IN IP4 192.0.2.101
t=0 0
m=audio 49172 RTP/AVP 0
a=rtpmap:0 PCMU/8000
```

FIG. 3B

```
INVITE sip:bob@biloxi.example.com SIP/2.0
Via: SIP/2.0/TCP client.atlanta.example.com:5060;branch=z9hG4bK74bf9
;Max-Forwards: 69
From: Alice <sip:alice@atlanta.example.com>;tag=9fxced76sl
To: Bob <sip:bob@biloxi.example.com>
Call-ID: 3848276298220188511@atlanta.example.com
CSeq: 1 INVITE
Contact: <sip:alice@client.atlanta.example.com;transport=tcp>
Content-Type: application/sdp
Content-Length: 151 v=0
o=alice 2890844526 2890844526 IN IP4 client.atlanta.example.com
s=-
c=IN IP4 192.0.2.101
t=0 0
m=audio 49172 RTP/AVP 0
a=rtpmap:0 PCMU/8000
```

METHOD AND SYSTEM FOR ANALYZING PROTOCOL MESSAGE SEQUENCE COMMUNICATED OVER A NETWORK

This application claims the benefit of Indian Patent Application Serial No. 201841024386, filed Jun. 29, 2018, which is hereby incorporated by reference in its entirety.

FIELD

This disclosure generally relates to techniques for processing network packets, and more particularly to a method and system for analyzing protocol message sequences communicated over a network.

BACKGROUND

Most of the network devices in use today are highly complicated and troubleshooting of the network devices is increasingly complex as the devices include numerous components and features. To start with, each network device may not have been engineered to handle certain error conditions occurring during a communication session. In some scenarios, problems with the configuration of the network devices may lead to generation of an improper response code or an error response code, which may result in dropping packets during the communication session. To troubleshoot the errors occurring in the data packets, a network monitoring tool commonly referred to as a "sniffer" or "protocol analyzer" may be used to capture the network traffic data. The captured data may then be analyzed manually i.e., by application developers or expert troubleshooters to resolve the network errors.

Alternatively, the captured data may be provided to a network testing and validation lab. In this case, errors/issues that occur in real time communication session in-site are difficult to reproduce in the network testing and validation lab because the exact scenario of events leading to network problem is difficult to be replicated in the lab environment and hence the root cause of the network error becomes difficult to analyze.

SUMMARY

In one embodiment, a method of analyzing protocol message sequences communicated over a network is disclosed. The method may include receiving, by a network analyzer, one or more protocol messages associated with a real-time communication session between a first network device and a second network device in the network. A set of packet attributes corresponding to the one or more protocol messages associated with the real-time communication session, may be extracted by the network analyzer. Each one of the set of packet attributes may then be compared with a plurality of baseline attributes by the network analyzer. At least one error condition in at least one protocol message received from the first network device may be determined by the network analyzer based on the comparison. A corrective measure on the first network node may be performed by the network analyzer based on the at least one error condition in the at least one protocol message received from the first network device.

In one embodiment, a network analyzer is disclosed. In one example, the network analyzer may include a capture module, an extraction module, and an analyzing module. The capture module may receive one or more protocol messages associated with a real-time communication session between a first network device and a second network device in the network. The extraction module may extract a set of packet attributes corresponding to the one or more protocol messages associated with the real-time communication session. The analyzing module may compare each one of the set of packet attributes with a plurality of baseline attributes. Further, the analyzing module may determine at least one error condition in at least one protocol message received from the first network device based on the comparison. Furthermore, the analyzing module may perform a corrective measure on the first network node based on the at least one error condition in the at least one protocol message received from the first network device.

In one embodiment, a non-transitory computer-readable medium storing computer-executable instructions for analyzing protocol message sequences communicated over a network is disclosed. In one example, the stored instructions, when executed by a processor, may cause the processor to perform operations such as receiving, by the network analyzer, one or more protocol messages associated with a real-time communication session between a first network device and a second network device in the network. The operations may further include extracting, by the network analyzer, a set of packet attributes corresponding to the one or more protocol messages associated with the real-time communication session. The operations may further include comparing, by the network analyzer, each one of the set of packet attributes with a plurality of baseline attributes. The operations may further include determining, by the network analyzer, at least one error condition in at least one protocol message received from the first network device based on the comparison. The operations may further include performing, by the network analyzer, a corrective measure on the first network device based on the at least one error condition in the at least one protocol message received from the first network device.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIGS. 3A-3B show an example protocol message sequence including an invalid "SIP INVITE message" generated by a gateway for a first VOIP communication session according to an exemplary embodiment of the present disclosure.

FIGS. 4A-4B show an example protocol message sequence including a valid "SIP INVITE message" generated by the gateway for a subsequent communication session after performing the corrective measure on the gateway.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
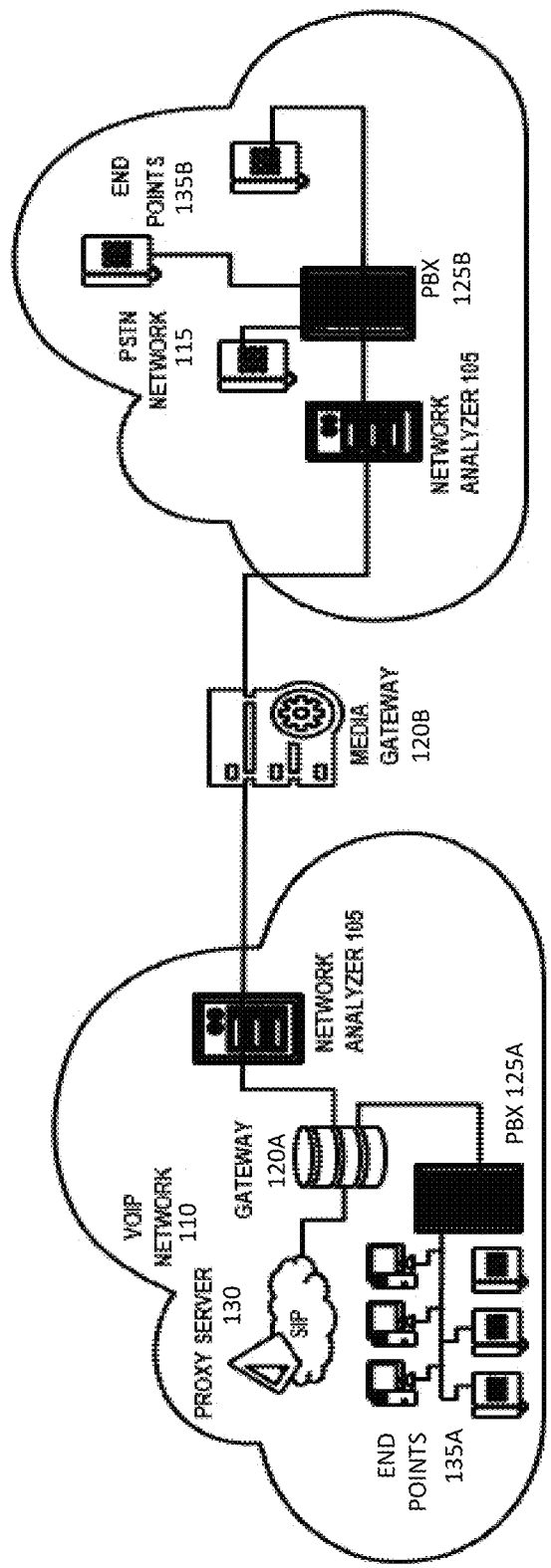
FIG. 1 is an example network in which a network analyzer of an exemplary embodiment of the present disclosure may be applied.

FIG. 1 is an example communication network 100 that includes a network analyzer 105, in which various embodiments of the invention may function is illustrated. The network analyzer 105 may be placed at various points within a network such as voice, data, voice over data, and/or Voice over IP (VOW) network 110, public switched telephone network (PSTN) 115, and the like. In operation, the network analyzer 105 may analyze the expected/unexpected errors relevant to protocol messages i.e., signaling messages communicated between the network devices such as routers, gateways 120A-120B, IP-Private Branch Exchanges (IP-PBXs) 125A-125B, proxy servers 130 and the like during a real-time communication session between endpoints 135A-135B. Used herein the signaling messages are request-response protocol messages, such as Session Initiation Protocol (SIP) message for VOIP call session, Hyper Text Transfer Protocol (HTTP) message for client-server web session, and Multi-Purpose Internet Mail Extensions (MIME) protocol (i.e., an extension of the original Internet e-mail protocol) for exchanging different types of data files on the Internet. Based on the analysis results, changes/modifications may be made to configuration settings of the network device to improve its reliability subject to the errors.

Figure 2:
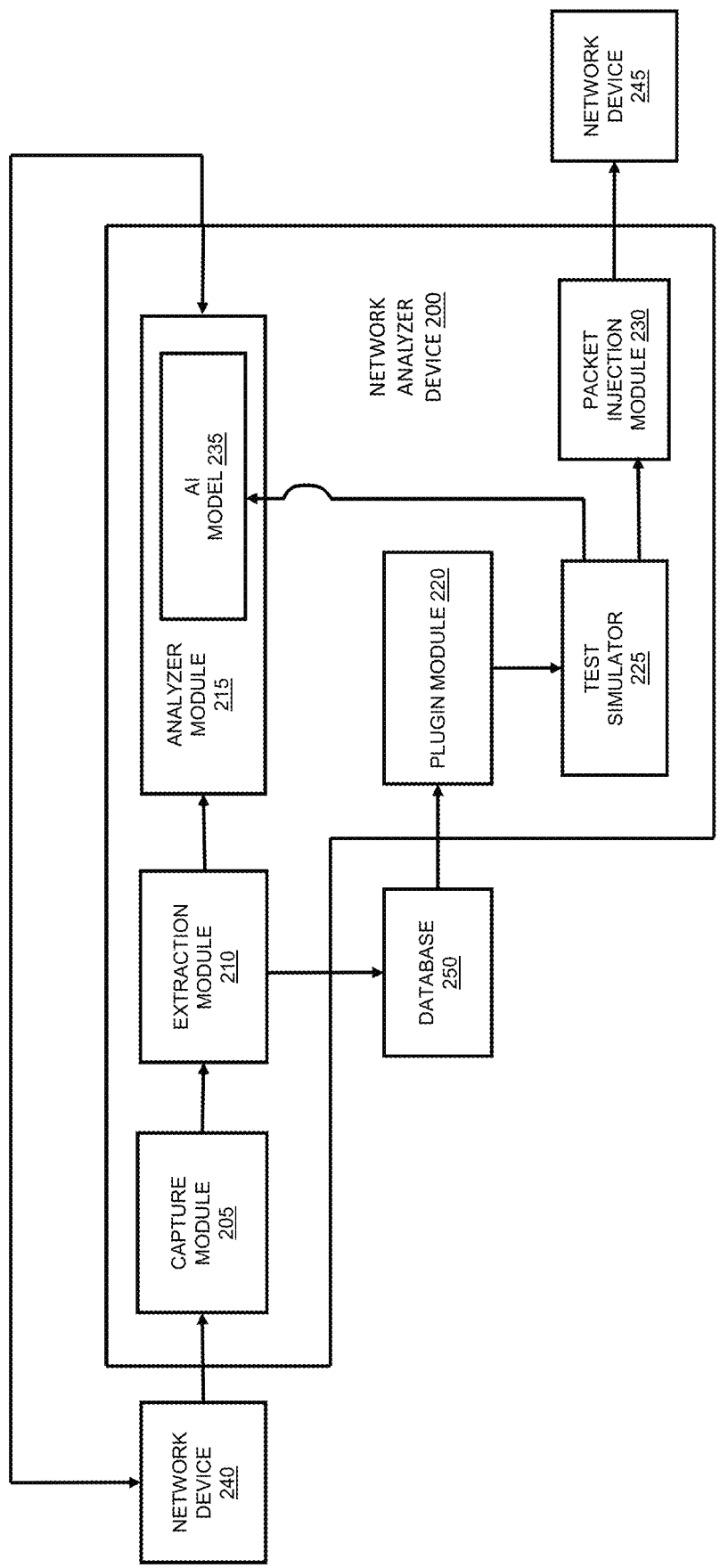
FIG. 2 is a functional block diagram of a network analyzer for analyzing protocol message sequences communicated between two network devices according to an exemplary embodiment of the present disclosure.

FIG. 2 is a functional block diagram of a network analyzer 200 according to an exemplary embodiment of the present disclosure. The network analyzer 200 may include a capture module 205, an extraction module 210, an analyzer module 215, a plug-in module 220, a simulation module 225, and a packet injection module 230. During operation, the capture module 205 may receive one or more protocol messages associated with a real-time communication session between a first network device 240 and a second network device 245 in the network. Example capture module 205 may be a packet sniffer that is a computer program designed to capture different types of protocol messages from information packets traveling over the network. In one example, the protocol message may include: SIP messages such as INVITE, OK, ACK/PRACK, BYE, and CANCEL for signaling a VOIP communication session; and Real-time Transport Protocol (RTP) messages for enabling controlled, on-demand delivery of real-time data, such as audio and video in the VOIP communication session.

Upon reception, the extraction module 210 may extract a set of packet attributes corresponding to the one or more protocol messages associated with the real-time communication session. In other example, the extraction module 210 may extract a set of packet attributes from a header and/or a payload of the protocol messages. The set of packet attributes may be associated with one of a plurality of network protocols supported by the first network device 240. In one example, the packet attributes may include data-field-values pertaining to Max-forwards, CSeq number, content-type, and content-length for a "SIP INVITE" message in the VOIP call.

Used herein, the Max-Forwards value is an integer in the range 0-255 to limit the number of proxies or gateways that can forward the SIP INVITE request. The count of Max-Forwards value is decremented by each node that forwards the request. The recommended Max-Forwards value is 70. Used herein, the CSeq value may guarantee proper ordering of the SIP requests. The CSeq value may be incremented by one for each SIP request with the same Call-ID. Used herein, the content-type header field indicates the media type of the message-body sent to the recipient. Used herein, the content-length header field may indicate the size of the message-body, in decimal number of octets, sent to the recipient. In some example, the extraction module may also extract the packet attributes which may be network topology information associated with the protocol message. Used herein the network topology information may indicate geographical information pertaining to individual network devices through which the protocol message is being transmitted to reach the destination IP address to determine a logical topology of the various network devices coupled over the network.

In order to analyze the one or more protocol messages associated with the real-time communication session, the analyzer module 215 may compare each one of the set of packet attributes with a plurality of baseline attributes. The "baseline attributes" may refer to an acceptable defined and/or definable subset values associated with the packet attributes of protocol message. The baseline attributes may include different parameters for various network protocols that are supported by the network devices 245 and 250. For example, the extracted data-field-values of the SIP INVITE message is compared to the baseline value (i.e., Max-forwards: "70"; Cseq: 1 INVITE; Content-type: application/sdp, and Content length: 151). When the comparison result deviates from the baseline value, the analyzer module 215 may determine at least one error condition in at least one protocol message received from the first network device 240. In one example, the at least one error condition may include invalid data fields or invalid extensions in the protocol messages. In the aforementioned "SIP INVITE" message, the at least one error condition may include invalid protocol version, incorrect IP address in message body, invalid Max-Forwards, invalid CSeq number, invalid content length, and invalid content-type.

A corrective measure on the first network device 240 may be performed based on the at least one error condition in the at least one protocol message received from the first network device 240. In some embodiments, the corrective measure may be performed by adjusting a configuration setting in the first network device 240 based on the invalid data fields or invalid extensions in at least one protocol message associated with the real-time communication session. Based on the adjusted configuration setting in the first network device 240, the first network device 240 may be commanded to generate at least one protocol message with the valid data fields or the valid extensions for a subsequent communication session. Example corrective measures may also include configuring the protocol timers, configuring the correct protocol version, and configuring the correct public IP addresses of external entities.

Further, the analyzer module 215 possesses/encompass an artificial intelligence module 235 to iteratively learn by mapping each corrective measure and associated errors relevant to the protocol messages communicated between the first network device 240 and the second network device 245. Further, machine learning capability of the artificial intelligence module 235 may learn the effect such as "recurrence of the particular error" or "fixing the particular error" after performing the corrective measure on the first network device.

The baseline attributes associated with each of the plurality of network protocols may be dynamically updated, by the AI module 235, based on the mapped information of: corrective measures and associated errors relevant to the protocol messages generated by the first network device 240. The AI model may further keep on updating the baseline attributes with each new validating cycle that may be undertaken by the network analyzer 200. Using the updated baseline attributes, the analyzer module 215 may analyze a set of packet attributes associated with a subsequent communication session.

In one example, the one or more protocol messages associated with the real-time communication session may be stored in a database 250, and then ported to a testing simulator 225 through the plug-in module 220. In the testing simulator 225, the protocol message with the at least one error condition that occur in the real-time communication session may be automatically created/reproduced as a test scenario. The testing simulator 225 may run the test scenario to determine a root-cause associated with the at least one error condition relevant to the protocol messages. In this way, the analyzer module 215 maintains a relatively current view of what is "normal" and can continuously monitor the protocol messages for anomalies. The testing simulator 225 used herein may be a built-in or add-on component of the network analyzer 200.

In parallel, the packet injection module 230 may inject the protocol messages to a communication link/path between the first network device 240 and the second network device 245. In one example, the network analyzer device 200 may perform at least one of: removing incorrect data, updating incorrect data, removing incomplete data, updating incomplete data, removing improperly formatted data, updating improperly formatted data, and removing duplicated data in the protocol messages at the time of on-going/real-time communication session.

Figure 3A:
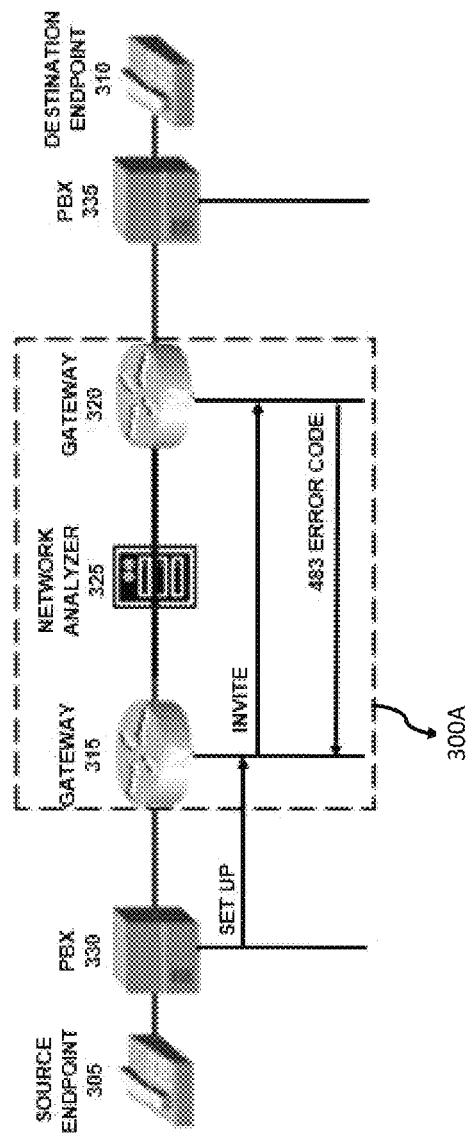

FIGS. 3A-3B illustrate an example protocol message sequence communicated over a VOIP network according to an exemplary embodiment of the present disclosure. As shown in FIG. 3A, a VOW communication session 300A may be initiated from a source endpoint 305 to a destination endpoint 310 through a first gateway 315 (i.e., first network device) and a second gateway 320 (i.e., second network device). The network analyzer 325 may be placed between the gateways 315 and 320 for analyzing the expected/unexpected errors relevant to SIP signaling messages communicated between the gateways 315 and 320. In this case, the call flow 300A between the gateways 315 and 320 proceeds as follows: upon receiving a call setup signal from the source endpoint 305 through a PBX 330, the gateway 315 may send a SIP INVITE message to gateway 320. The network analyzer 325 may receive the SIP INVITE message and then extract the data-field-values such as Max-forwards: "0"; Cseq: 1 INVITE; content-type: application/sdp, content length: 151 corresponding to the SIP INVITE message.

Each one of data-field-values corresponding to the SIP INVITE message may be compared with a plurality of baseline attributes (i.e., Max-forwards: "70"; Cseq: 1 INVITE; Content-type: application/sdp, Content length: 151). Based on the comparison, the network analyzer 325 may determine that the data-field-value of Max-forwards in the SIP INVITE is deviating from the baseline attributes such that the gateway 315 may not able to forward the SIP INVITE request to the gateway 320. Accordingly, the network analyzer 325 may determine an error condition, i.e., a "483 error response" (indicating the SIP INVITE is rejected with "Too Many Hops"), resulting in the VOW call drop. Further, a root cause analysis for the error condition, i.e., a "483 error response" (indicating the SIP INVITE is rejected with "Too Many Hops") may be performed by porting the entire protocol message sequence to the in-built/add-on testing simulator.

Figure 4A:
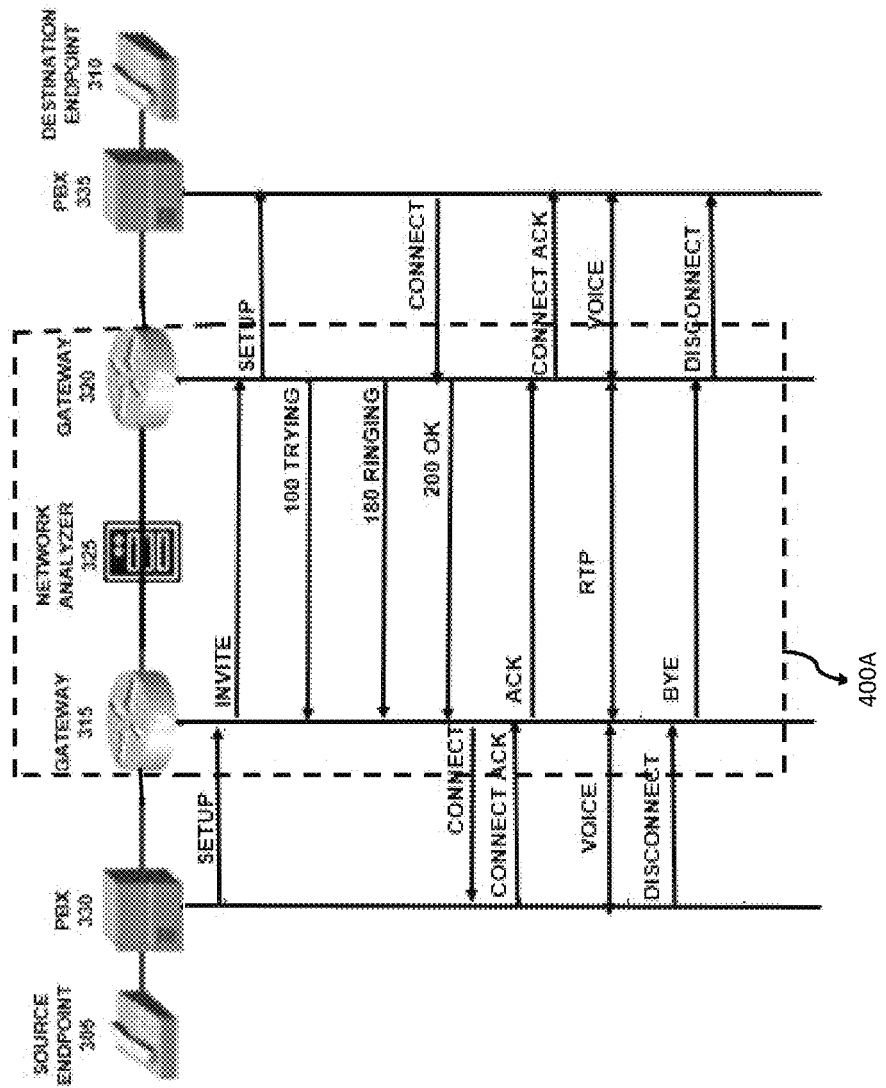

To perform corrective measure corresponding to the "483 error response" in the SIP INVITE message, as shown in FIGS. 4A-4B the network analyzer 325 may automatically enable the modification of the configuration settings such as nodal tables, addresses and/or policies of the gateway 315 corresponding to the error condition associated with the Max-forward header. Accordingly, as shown in FIG. 4B, for a next VOW communication session 300B mediated through the gateway 315, the SIP INVITE message having a valid Max-forward value (e.g., 69) may be generated by the gateway 315. Thus, the gateway 315 may forward the SIP INVITE message to the gateway 320. Then, a normal call flow 400A may be facilitated between the source endpoint 305 and the destination endpoint 310 through the gateways 315 and 320. Once a Connect acknowledgement is provided from the gateway 320 to the PBX 335, the VOIP call is active. At this point, as shown in FIG. 4A normal voice streams communicated between the two endpoints 305 and 310 and the gateways 315 and 320, and RTP voice streams exist between the two gateways 315 and 320.

In particular, as will be appreciated by those of ordinary skill in the art, capture module 205, extraction module 210, analyzer module 215 including AI module 235, testing simulator 225, and packet injection module 230 for performing the techniques and steps described herein may be implemented in the network analyzer, either by hardware, software, or combinations of hardware and software. For example, suitable code may be accessed and executed by the one or more processors on the network analyzer to perform some or all of the techniques described herein. Similarly application specific integrated circuits (ASICs) configured to perform some or all of the processes described herein may be included in the one or more processors on the host computing system. Even though FIGS. 1-2 describe about network analyzer 105 and 200, the functionality of the components of network analyzer 105 and 200 may be implemented in any network devices.

Figure 5:
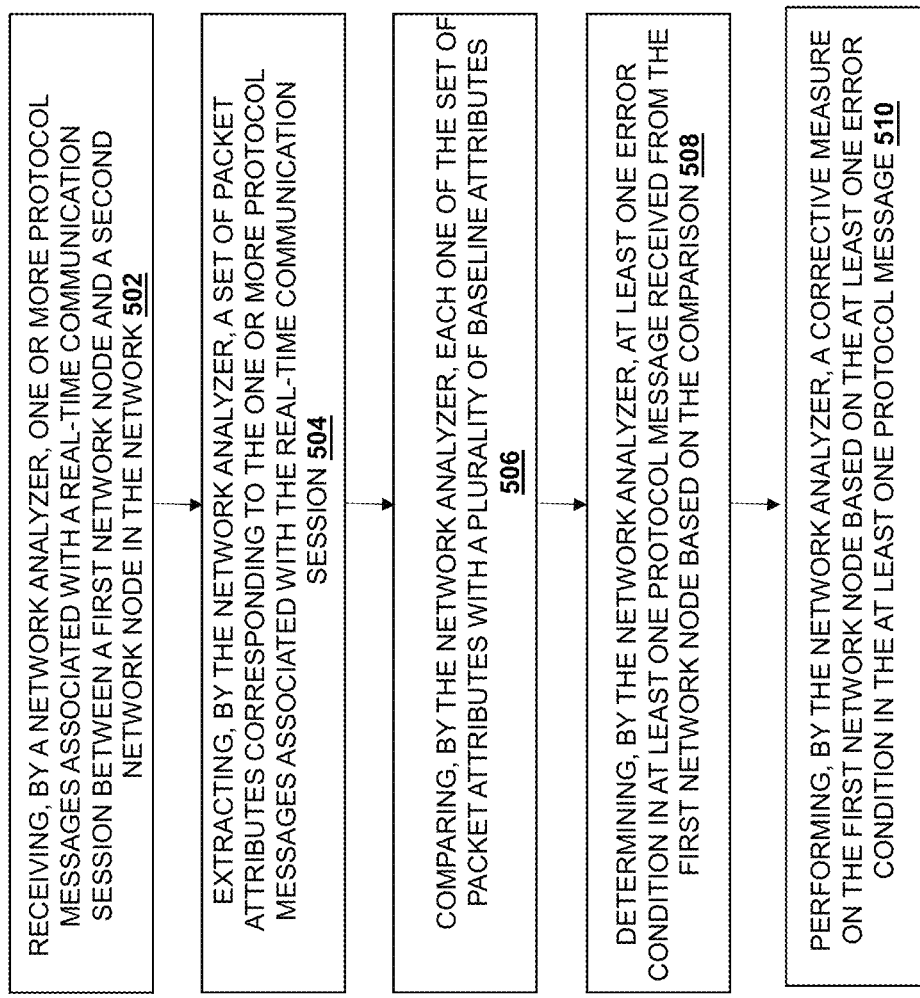
FIG. 5 is a flow diagram illustrating a method of analyzing protocol message sequence communicated over a network, in accordance with an exemplary embodiment of the present disclosure.

Referring now to FIG. 5, a flow diagram illustrating a method of analyzing protocol message sequence communicated over a network in accordance with some embodiments of the current disclosure is disclosed. As illustrated in FIG. 5, at step 502, one or more protocol messages associated with a real-time communication session between a first network node and a second network node in the network, may be received by a network analyzer. At step 504, a set of packet attributes corresponding to the one or more protocol messages associated with the real-time communication session, may be extracted by the network analyzer. Example set of packet attributes are associated with one of a plurality of network protocols supported by the first network device.

At step 506, each one of the set of packet attributes may be compared by the network analyzer, with a plurality of baseline attributes. At step 508, at least one error condition in at least one protocol message may be determined by the network analyzer, based on the comparison. Example at least one error condition detected in one or more messages may include invalid data fields or invalid extensions in the protocol messages. Example network analyzer may possess AI capability which may learn from the inherent information of training data and learn from the continuous analysis of failures occurring within a network. The network analyzer may be able to analyze some common threads across the failures to make prediction about the future failures or otherwise unknown events that might can happen due to such discrepancy. Example common threads across the failures, may include but not limited to, improperly configured network timers, incorrect source and destination address in the data packet and/or improperly formatted IPv4/IPv6 addresses.

On taking in consideration the inherent information and the various predictions made by the network analyzer, a decision model may be generated by the network analyzer. Example decision model may include baseline behavior for different parameters of various protocols stored within the data packets to make decision by comparing the database information with the decision model information in order to look for any discrepancies which are further leading to a failure. Further, the network analyzer may update the values of baseline behavior for continuous evaluation of data packets traversing across the network. Further, the network analyzer may use the updated baseline behavior as comparison table for data validation and protocol specification analysis of various communication protocols stored within the data packets.

At step 510, a corrective measure on the first network node may be performed by the network analyzer, based on the at least one error condition in the at least one protocol message received from the first network node. In one example, the corrective measure may involve adjusting a configuration setting in the first network node based on the invalid data fields or invalid extensions in at least one protocol message associated with the real-time communication session. Based on the adjusted configuration setting in the first network node, the first network node may be commanded to generate at least one protocol message with the valid data fields or the valid extensions for a subsequent communication session.

Further, the analyzer module possesses machine learning capability to iteratively learn by mapping each corrective measure and associated errors relevant to the protocol messages communicated between the first network device and the second network device. The baseline attributes associated with each of the plurality of network protocols may be dynamically updated, by the machine learning module, based on the mapped information of corrective measures and associated errors relevant to the protocol messages. Using the updated baseline attributes, the analyzing module may analyze a set of packet attributes associated with a subsequent communication session. The terms "analyzing module" and "analyzer module" may be used interchangeably throughout the document.

In one example, the one or more protocol messages associated with the real-time communication session may be stored in a database, and then ported to a testing simulator for determining a root-cause associated with the at least one error condition. The testing simulator used herein may be built-in or add-on component of the network analyzer.

Additional illustrative embodiments are listed below. In one embodiment, a network analyzer including a processor and non-transitory computer-readable medium communicatively coupled to the processor through a system bus is disclosed. The processor may be any type of central processing unit (CPU), microprocessor, or processing logic that interprets and executes machine-readable instructions stored in non-transitory computer-readable medium. Example non-transitory computer-readable medium may be a random access memory (RAM) or another type of dynamic storage device that may store information and machine-readable instructions that may be executed by the processor. For example, non-transitory computer-readable medium may be synchronous DRAM (SDRAM), double data rate (DDR), rambus DRAM (RDRAM), rambus RAM, etc., or storage memory media such as a floppy disk, a hard disk, a CD-ROM, a DVD, a pen drive, and the like. In an example, machine-readable storage medium 504 may be remote but accessible to the network analyzer.

The non-transitory computer-readable medium may store computer-executable instructions for analyzing a protocol message sequence communicated over a network. In one example, the stored instructions, when executed by the processor, may cause the processor to perform operations such as receiving, by a network analyzer, one or more protocol messages associated with a real-time communication session between a first network node and a second network node in the network. The operations may further include extracting, by the network analyzer, a set of packet attributes corresponding to the one or more protocol messages associated with the real-time communication session. The operations may further include comparing, by the network analyzer, each one of the set of packet attributes with a plurality of baseline attributes. The operations may further include determining, by the network analyzer, at least one error condition in at least one protocol message received from the first network node based on the comparison. The operations may further include performing, by the network analyzer, a corrective measure on the first network node based on the at least one error condition in the at least one protocol message received from the first network node.

In some other embodiment, the network analyzer may able to analyze some common threads across the failures to make prediction about the future failures or otherwise unknown events that might can happen due to such discrepancy. Example common threads across the failures, may include but not limited to improperly configured network timers, incorrect source and destination address in the data packet and/or improperly formatted IPv4/IPv6 addresses.

To detect the errors corresponding to the incorrect network timers, the network analyzer may measure the jitter and network delay in network data packets between any two network nodes. Based on the jitter and network delay measurement, the network analyzer may infer that a network node is down or there is high traffic or congestion in a route between the two network nodes. In one example, the jitter can be measured by comparing the difference in the time at which packets (e.g., RTP packets in VOIP communication session) are received over the network.

In another example, error may occur corresponding to a timer value which is defined for each message transmitted over UDP. In one example, the retransmissions and the time between the successive retransmissions can be measured by the network analyzer, to determine if a particular node in the network is down or not accessible. Based on the determination, the network analyzer may flag errors in the network configuration, or detect nodes that are malfunctioning. In this case, the network analyzer module may recommend the correct timer values to be used considering the transmission protocol used for the data packets and the network conditions encountered between the source and destination nodes.

Further, in a communication session, errors due to incorrect source/destination IP addresses may result in incorrect routing or loss of packets to the wrong network device in the network. Examples of errors due to incorrect source/destination IP addresses may be private IP addresses instead of public IP addresses in the address field of the data packet. In this case, the network analyzer may determine the incorrectly formatted IPV4 or IPv6 addresses by checking the format of the headers of the IP packets and accordingly perform the corrective measure.

The specification has described analyzing protocol messages in the network analyzer. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of analyzing a protocol message sequence communicated over a network, the method comprising:
   receiving, by a network analyzer, one or more protocol messages associated with a real-time communication session between a first network node and a second network node in the network;
   extracting, by the network analyzer, data-field-values that pertain to: Maximum (Max)-forwards, Command Sequence (CSeq) number, content-type, and content-length for each protocol message received from the first network node;
   comparing, by the network analyzer, each one of the extracted data-field-values with a plurality of baseline values associated with each of the plurality of network protocols, wherein comparison is based on the plurality of baseline values, which are dynamically updated by the network analyzer based on learning from a mapped information of corrective measures and associated errors relevant to the one or more protocol messages;
   determining, by the network analyzer, at least one error condition pertaining to: invalid Max-forwards, invalid CSeq number, invalid content length, and invalid content-type in at least one protocol message received from the first network node based on the comparison; and
   performing, by the network analyzer, a corrective measure on the first network node based on the at least one error condition in the at least one protocol message received from the first network node, wherein performing the corrective measure by the network analyzer comprises:
      adjusting a configuration setting that comprises: nodal tables, addresses and/or policies in the first network node corresponding to the at least one error condition in the at least one protocol message; and
      generating the at least one protocol message with the valid data fields or the valid extensions for a subsequent communication session based on the adjusted configuration setting in the first network node.

2. The method of claim 1, wherein at least one error condition is detected in one or more messages further comprising invalid extensions in the protocol messages.

3. The method of claim 2, wherein performing the corrective measure by the network analyzer, comprises:
   adjusting the configuration setting based on the invalid extensions in the at least one protocol message associated with the real-time communication session; and
   commanding the first network node to generate the at least one protocol message with the valid extensions for the subsequent communication session based on the adjusted configuration setting in the first network node.

4. The method of claim 1 further comprising:
   dynamically updating, by the network analyzer, the baseline values associated with each of the plurality of network protocols; and
   analyzing, by the network analyzer, data-field-values associated with the subsequent communication session using the updated baseline attributes.

5. The method of claim 1 further comprising determining, by the network analyzer, one or more root causes associated with the at least one error condition in the at least one protocol message received from the first network node.

6. The method of claim 1 further comprising:
   storing, in a database, the one or more protocol messages associated with the real-time communication session between the first network node and the second network node; and
   porting the one or more protocol messages with the at least one error condition to a testing simulator to determine one or more root causes associated with at least one error condition.

7. A network analyser comprising:
   a processor; and
   a memory coupled to the processor which is configured to be capable executing programmed instructions comprising and stored in the memory to:
      receive one or more protocol messages associated with a real-time communication session between a first network node and a second network node in the network;
      extract data-field-values that pertain to: Maximum (Max)-forwards, Command Sequence (CSeq) number, content-type, and content-length for each protocol message received from the first network node;
      compare each one of the extracted data-field-values with a plurality of baseline values associated with each of the plurality of network protocols, wherein the comparison is based on the plurality of baseline values, which are dynamically updated by the network analyzer based on learning from a mapped information of corrective measures and associated errors relevant to the one or more protocol messages;

determine at least one error condition pertaining to: invalid Max-forwards, invalid CSeq number, invalid content length, and invalid content-type in at least one protocol message received from the first network node based on the comparison; and perform a corrective measure on the first network node based on the at least one error condition in the at least one protocol message received from the first network node, wherein performing the corrective measure by the network analyzer comprises:

adjusting a configuration setting that comprises: nodal tables, addresses and/or policies in the first network node corresponding to the at least one error condition in the at least one protocol message; and generating the at least one protocol message with the valid data fields or the valid extensions for a subsequent communication session based on the adjusted configuration setting in the first network node.

8. The network analyser of claim 7, wherein at least one error condition is detected in one or more messages further comprising invalid extensions in the protocol messages.

9. The network analyser of claim 8, wherein the processor is further configured for the perform the corrective measure on the first network node to be capable of executing the stored programmed instructions to:

adjust the configuration setting in the first network node based on the invalid extensions in the at least one protocol message associated with the real-time communication session; and command the first network node to generate the at least one protocol message with the valid extensions for the subsequent communication session based on the adjusted configuration setting in the first network node.

10. The network analyser of claim 7 wherein the processor is further configured to be capable of executing the stored programmed instructions to:

dynamically update the baseline values associated with each of the plurality of network protocols; and analyze data-field-values associated with the subsequent communication session using the updated baseline attributes.

11. The network analyser of claim 7 wherein the processor is further configured to be capable of executing the stored programmed instructions to determine one or more root causes associated with the at least one error condition in the at least one protocol message received from the first network node.

12. The network analyser of claim 7 wherein the processor is further configured to be capable of executing the stored programmed instructions to store the one or more protocol messages associated with the real-time communication session between the first network node and the second network node.

13. The network analyser of claim 7 wherein the processor is further configured to be capable of executing the stored programmed instructions to port the one or more protocol messages with the at least one error condition to a testing simulator to determine one or more root causes associated with at least one error condition.

14. A non-transitory computer-readable storage medium having stored thereon instructions comprising executable code which when executed by one or more processors, causes the one or more processors to:

receive one or more protocol messages associated with a real-time communication session between a first network node and a second network node in the network;

extract data-field-values that pertain to: Maximum (Max)-forwards, Command Sequence (CSeq) number, content-type, and content-length for each protocol message received from the first network node;

compare each one of the extracted data-field-values with a plurality of baseline values associated with each of the plurality of network protocols, wherein the comparison is based on the plurality of baseline values, which are dynamically updated by the network analyzer based on learning from a mapped information of corrective measures and associated errors relevant to the one or more protocol messages;

determine at least one error condition pertaining to: invalid Max-forwards, invalid CSeq number, invalid content length, and invalid content-type in at least one protocol message received from the first network node based on the comparison; and perform a corrective measure on the first network node based on the at least one error condition in the at least one protocol message received from the first network node, wherein performing the corrective measure by the network analyzer comprises:

adjusting a configuration setting that comprises: nodal tables, addresses and/or policies in the first network node corresponding to the at least one error condition in the at least one protocol message; and generating the at least one protocol message with the valid data fields or the valid extensions for a subsequent communication session based on the adjusted configuration setting in the first network node.

15. The method of claim 6 further comprising porting the one or more protocol messages with the at least one error condition to a testing simulator to determine one or more root causes associated with at least one error condition.

* * * * *